United States Patent [19]

Hirt

[11] 4,373,512
[45] Feb. 15, 1983

[54] METHOD AND APPARATUS FOR PROTECTING AN ARRANGEMENT LOCATED IN AN AREA OF HIGHLY CONCENTRATED RADIATION

[75] Inventor: Alfred Hirt, Munich, Fed. Rep. of Germany

[73] Assignee: Maschinenfabrik Augsburg-Nurnberg Aktiengesellschaft, Munich, Fed. Rep. of Germany

[21] Appl. No.: 230,102

[22] Filed: Jan. 29, 1981

[30] Foreign Application Priority Data

Feb. 8, 1980 [DE] Fed. Rep. of Germany ....... 3004582

[51] Int. Cl.³ .............................................. F24J 3/02
[52] U.S. Cl. .................................. 126/418; 126/438; 126/439; 126/419
[58] Field of Search ............... 126/418, 422, 438, 439, 126/451, 417, 419; 60/641.15

[56] References Cited

U.S. PATENT DOCUMENTS

| 3,024,700 | 3/1962 | McClellan | 126/451 X |
| 3,927,659 | 12/1975 | Blake et al. | 60/641.15 X |
| 4,270,517 | 6/1981 | Stephens | 126/418 X |
| 4,289,114 | 9/1981 | Zadiraka | 126/422 X |
| 4,312,324 | 1/1982 | Ross et al. | 126/418 |

FOREIGN PATENT DOCUMENTS 2006420 5/1979 United Kingdom ............... 126/422

Primary Examiner—Larry Jones
Attorney, Agent, or Firm—Scully, Scott, Murphy & Presser

[57] ABSTRACT

Method and apparatus for the protection of an arrangement located in the region of highly-concentrated radiation, such as the radiation receiver of a solar tower project. Smoke cartridges forming a smoke fog or water vapor sprays form a diffusion radiation in the path of radiation towards the arrangement so as to lower any critically or excessively high temperature capable of causing damage to the arrangement.

10 Claims, 3 Drawing Figures

METHOD AND APPARATUS FOR PROTECTING AN ARRANGEMENT LOCATED IN AN AREA OF HIGHLY CONCENTRATED RADIATION

BACKGROUND OF THE INVENTION

1. Field of the Invention

The present invention relates to a method and apparatus for protecting an arrangement which is located in an area of highly-concentrated radiation, in particular, a radiation receiver of a solar tower project.

2. Discussion of the Prior Art

Due to the general shortage of energy, considerable efforts are being expended towards rendering solar energy usable. For example, it is known to direct sunbeams onto a heliostatic area (mirror panel) which reflects the incident rays and conducts them concentrated onto an effective area of, for instance, a heat exchanger system which absorbs the focused, concentrated energy in the form of heat and transfers it to another medium such as, for example, air. The hot gas which is produced in this manner is mostly employed for the operation of a hot-gas turbine for the purpose of generating electrical energy. The heliostatic area consists of a plurality of adjoiningly positioned, mutually independently controllable individual mirrors which, computer controlled, can be set to track the changing solar radiation during the course of a day in such a manner that the reflected rays will always collimatedly impinge against the effective surface. A heliostatic field can evidence a mirror diameter of up to 1000 m, wherein the effective area is located in a central, elevated position in essence, in the shape of a gas tower (up to 200 m high), which supports at its upper end the so called receiver incorporating the effective surface, (for example, a GAST receiver). The receiver is so conceived that it can be loaded up to the limit of the thermal capacity of its material. It is, therefore, extremely susceptible even to only short-term malfunctions which will lead to an overload. When the concentrated reflected field of rays is directed onto an area located outside the effective field, there is likely to ensue overheating of the outer walls of the receiver and of the gas tower when there are malfunctions in the heliostatic field or upon movement of the focal point out of the effective surface. Malfunctions in the heliostatic field may be the formation of so called "hot spots" or the failure of the (computer controlled) heliostatic control system. The mentioned overheating can also be caused by malfunctions in the heat exchanger circuit (interruption of cooling as a result of leakage, emergency shutdown of the turbine resulting from turbine disruptions).

The heliostatic field consists of individual heliostats which are capable of rapid changes about the axis of elevation and of slow changes about the axis of rotation, controlled by a central computer. The maximum speed of travel of known heliostats is approximately 320°/hr. Therefore it requires about two minutes to move the heliostats panel from the effective surface, the so called aperture of the receiver. Considering that a fast "emergency shut-down" (for instance, mechanical reversal of the mirrors) is not provided for in known systems due to technical reasons, receiver and gas tower regions will be overheated and frequently destroyed at full solar radiation even at known movement of the mirrors out of the aperture.

Thus, during operation, every solar tower project is subject to an unforseeable disruption (for instance, power failure of the computer control system, emergency shutdown of the turbine (about 10 secs.), as well as at a known (slow) controlling out of the heliostat mirrors from the effective field, due to the possible danger of a detrimental overheating.

SUMMARY OF THE INVENTION

Accordingly, proceeding from the problems encountered in the current state of the art, the present invention provides for a method and apparatus for protecting an arrangement of the above type which is located in an area of highly-concentrated radiation, wherein the method and apparatus employs simple means to effectively prevent the arrangement from being overheated as a result of incident rays.

It is a more specific object of the present invention to cause a radiation diffusing fluid to be emitted in the path of rays which are directed towards the arrangement, with the diffusion of the radiation preferably being produced by diffuse dispersion.

The inventive diffusion radiation can be especially started by a smoke generation or fogging, in essence, using an advantageous method with the aid of a smoke cartridge which is ignited when the arrangement is overheated. The inventive diffusion of radiation can also be initiated with the aid of a water evaporation, wherein, in particular, a jet or spray of water is directed into the path of the rays.

The inventive diffusion of radiation serves to energetically reduce the concentrated radiation directed onto the arrangement and to divert it into the open surroundings regions about the arrangement.

Moreover, the inventive diffusion of radiation can be initiated in the region of the arrangement, in the region of the source of radiation, or especially in the region of a reflector which is interposed between the source of radiation and the arrangement and, in essence, advantageously through the rapid shutdown of an automatically-operated safety device which is connected to the individual components of the arrangement which are to be protected.

For an arrangement which is to be protected, the duration of the protective effect afforded by the safety device can be determined by the degree of the diffusion of the radiation. For example, smoke cartridges or a water spray is directed for so long into the radiation path until the smoke effect or fogging causing the diffusion of radiation is so large as to prevent the arrangement from overheating. The degree of diffusion of the radiation can be measured through suitable means and can be employed for control in an automatic manner.

In an advantageous aspect of the present invention, pursuant to one protective radiation the smoke fogging or water vapor will be drawn out of the path of radiation so as to again assume normal operation of the plant. The drawing off of the fog or vapor can be effected through suitable blower or aspirating devices, wherein the energy of the drawn off medium which was particularly absorbed during a protective operation can be further utilized.

A suitable apparatus for implementing the method of the present invention contemplates that the arrangement is a receiver with an aperture of a gas-two solar tower project which includes a heat exchanger unit and a hot-gas turbine connected thereto, wherein the upper region of the gas tower supporting the receiver or on the radiation receiver itself there is located a firing or spraying device by means of which the smoke-producing medium or water can be conducted into the path of radiation between a controlled heliostat system and the radiation receiver.

The firing or spraying device suitably is arranged along the rim of the aperture of the radiation receiver.

In accordance with the present invention the concentrated light can thus be effectively and rapidly dispersed in the smoke fog so as to reduce the intensity of the radiation impinging on the receiver.

BRIEF DESCRIPTION OF THE DRAWINGS

Reference may now be had to a preferred embodiment of the invention, taken in conjunction with the accompanying drawings, in which.

DETAILED DESCRIPTION

Figure 1:
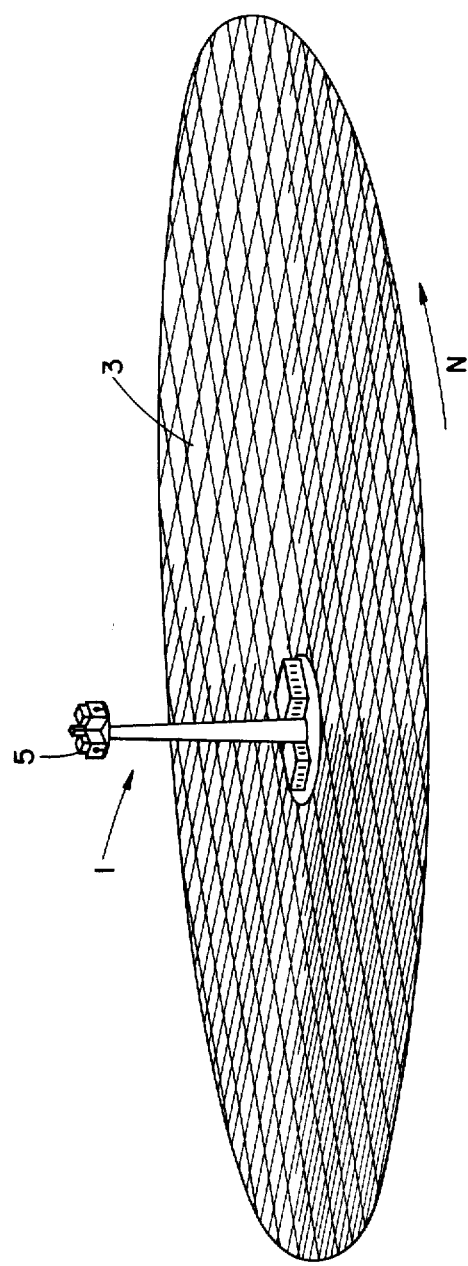
FIG. 1 is a schematic, perspective view illustrating a solar tower project with a gas tower supporting a receiver and with a heliostat field surrounding the tower.

Illustrated in FIG. 1 is a solar tower project 1 utilizing the solar energy which essentially consists of about 200 m high gas tower with a receiver attached to its upper end, and a heliostat field 3 constructed of individual mirrors surround the gas tower. The heliostat field may be as much as 1 km in diameter. The individual heliostats or reflectors 10 are capable of rapid revolution about the elevational axis and of slow revolution about the axis of rotation, and are controlled by a central computer and, in essence, in correlation with the movement of the sun in a manner so that the sun rays reflected from the individual heliostats 10 impinge upon a relatively small effective area of the receiver 5 of the solar tower project 1. The radiation impinging upon the effective area of the receiver 5 is highly concentrated, producing temperatures up to 1200° C. during operation.

Figure 2:
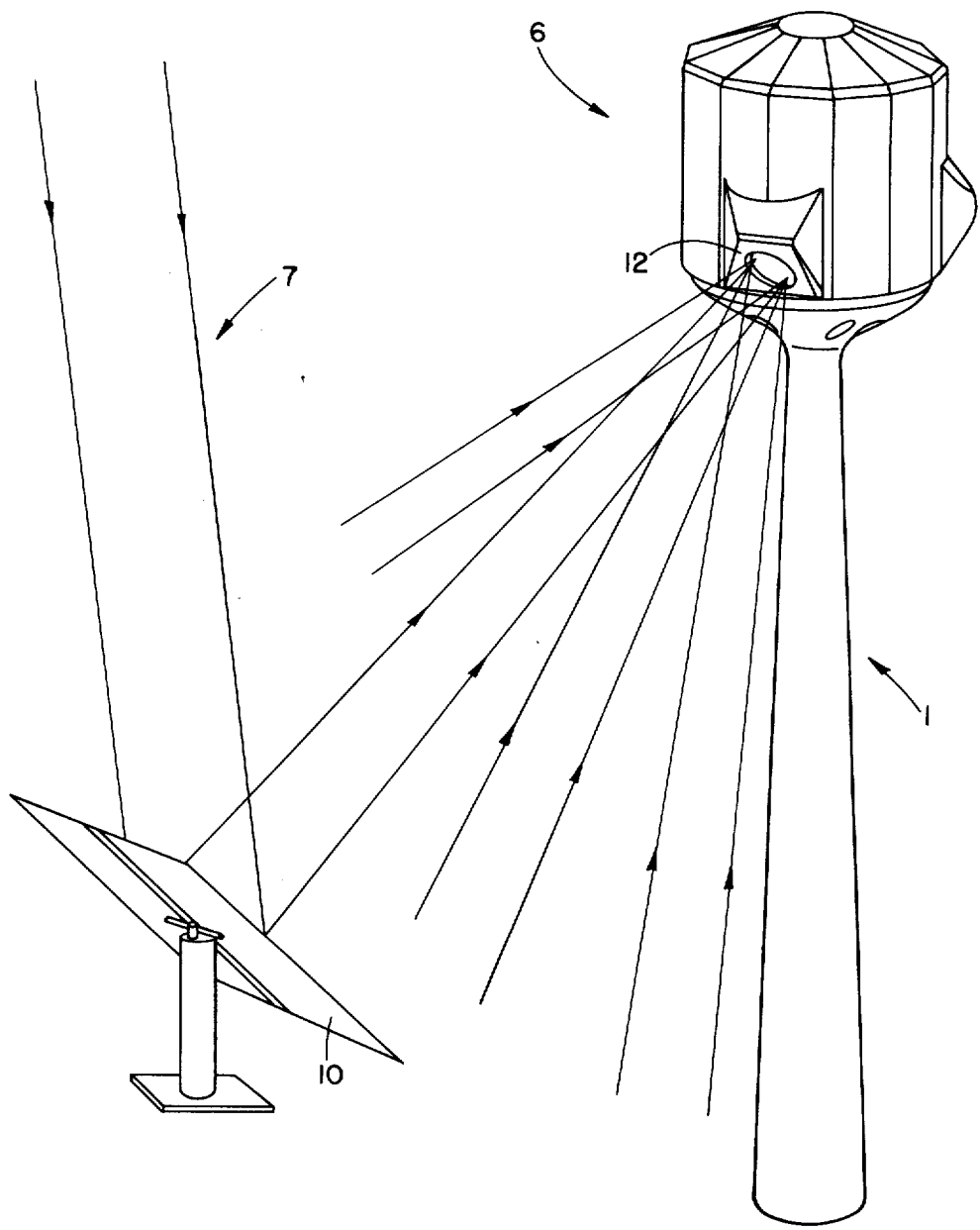
FIG. 2 is a perspective view illustrating a detail from FIG. 1 with a single, controllable heliostat.
Figure 3:
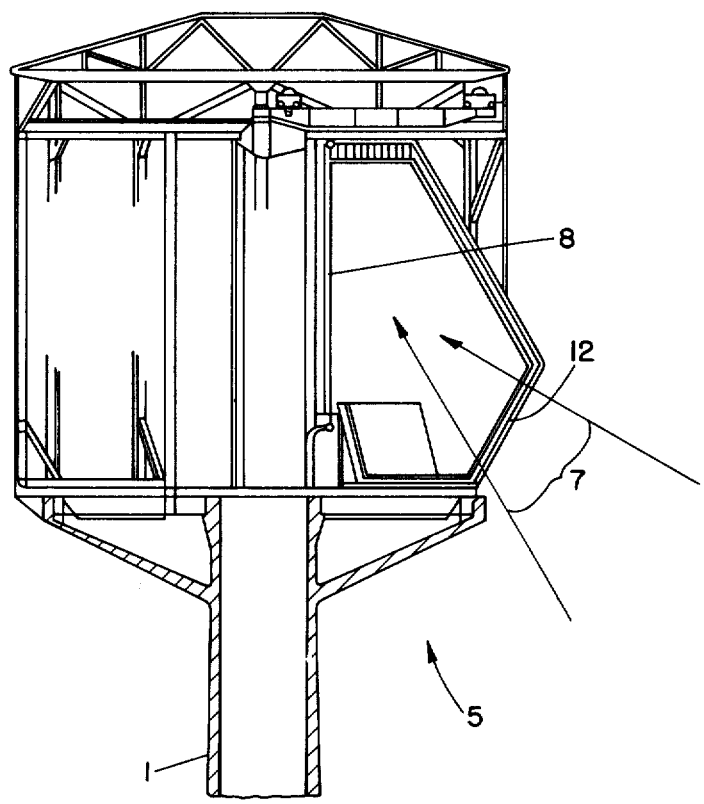
FIG. 3 is a vertical sectional view through the receiver shown in FIGS. 1 and 2.

As is shown in FIGS. 2 and 3, the arrangement 6 located in the region of highly-concentrated radiation essentially consists of the receiver 5 and the gas tower supporting the receiver 5. The receiver includes an inlet opening or aperture 12 for the highly-concentrated reflected radiation whereby, during operation of the installation, the radiation entering through the aperture of the receiver impinges against an effective surface within the receiver in the configuration of a heat exchanger 8. During operation, the cold air rising in the gas tower is warmed by the heat exchanger 8 and prepared for use in a hot-gas turbine which generates electrical energy and which, pursuant to FIG. 3, left-hand side, is arranged in the interior ("cavity") of the receiver 5.

In instances of malfunction, for example, in the event of an emergency shutdown of the hot-gas turbine or at a power failure of the central computer controlling the heliostat system, or when during normal operation due to any reason the arrangement 6 located in the region of highly-concentrated radiation must be protected from the high heat of radiation, one or more smoke cartridges are fired into the path of radiation 7 between the radiation source and the receiver 5, where they diffuse therein and form a smoke fog causing the concentrated light of radiation to be dispersed in the smoke and, consequently, a reduction in the intensity of radiation impinging upon the receiver. This diffusion of the radiation results in the arrangement 6, particularly that region of the arrangement which is located in the focal point of the arrangement 6, no longer being exposed to an excessively high operating temperature, thus eliminating the fear of material damage.

In an advantageous aspect of the invention, a firing device is provided on or within the solar tower itself, particularly in the upper receiver region or at the rim of the aperture 12 for the firing of smoke cartridges, so that for a diffusion of radiation operation a smoke cartridge need not travel a long distance from the firing device to the path of radiation, and in which the protective device can be operated not only effectively but also rapidly.

The fogging effect achieved by means of a smoke cartridge can also be replaced by water vaporization which will similarly produce a diffusion radiation in the path of the rays. For this purpose, one or more spraying devices are provided, similar to the abovementioned firing devices, in or on the upper region of the gas tower, with the aid of which a spray of water is injected into the path of the radiation, with the water immediately vaporizing because of the high operating temperatures.

The firing or spraying devices are suitably controlled. For example, temperature responsive sensors are provided in critical areas of the receiver 5 which will respond upon the exceeding of a certain temperature level is exceeded and cause the firing of a smoke cartridge or trigger a rain of water sprays. Critical regions of the receiver lie, above all, near the rim of the aperture 12 and in the region of the heat exchanger 8.

The radiation energy conducted away from the arrangement 6 by diffusion of the radiation can be further utilized in thermal or power generating systems.

In order to be able to rapidly resume normal operation of the installation after smoke generation or vaporization of water, ventilators or exhaust devices can be provided which remove the radiation diffusing medium, in its respective aggregative condition, from the radiation path between the source of radiation and the receiver. These types of exhaust devices or fans, can be particularly coupled with the systems will further utilize the (otherwise non-utilized) energy contained in the diffused radiation.

What is claimed is:

1. In a method for protecting an arrangement located in a region of highly-concentrated radiation, including a solar radiation receiver of a field of solar heliostats, the improvement comprising in diffusing radiation in the path of radiation directed towards the arrangement by directing a radiation diffusing fluid into said path of radiation such that the fluid itself causes diffusion of the radiation in said path.

2. Method as claimed in claim 1, comprising directing the radiation diffusing fluid into said path by spraying it into said path of radiation.

3. Method as claimed in claim 1, comprising directing a radiation diffusing smoke into said path of radiation.

4. Method as claimed in claim 3, comprising forming said smoke by firing at least one smoke cartridge.

5. Method as claimed in claim 1, comprising directing water vapor into said path of radiation.

6. Method as claimed in claim 5, comprising directing a water jet or spray into said path of radiation.

7. Method as claimed in claim 1, comprising directing the radiation diffusing fluid into said path of radiation in the region of the arrangement.

8. Method as claimed in claim 1, comprising directing the radiation diffusing fluid into said path of radiation in the region of the source of radiation.

9. Device for protecting an arrangement located in a region of highly-concentrated radiation, said arrangement comprising an apertured receiver of a gas tower-solar tower project having a heat exchanger unit and a hot gas turbine connected thereto; a firing or spraying device being located in the upper region of the gas tower supporting the receiver or on the receiver, said firing or spraying device being adapted to direct a smoke producing medium or water vapor into the path of radiation between a controlled heliostat system and the receiver.

10. Device as claimed in claim 9, said firing or spraying device being arranged along the rim of the aperture of the receiver.

* * * * *